United States Patent [19]

Nicoll

[11] Patent Number: 4,718,442
[45] Date of Patent: Jan. 12, 1988

[54] CRYOGENIC REFRIGERATOR COMPRESSOR WITH EXTERNALLY ADJUSTABLE BY-PASS/RELIEF VALVE

[75] Inventor: Harry G. Nicoll, Norwell, Mass.

[73] Assignee: Helix Technology Corporation, Waltham, Mass.

[21] Appl. No.: 834,201

[22] Filed: Feb. 27, 1986

[51] Int. Cl.⁴ .................................... F16K 17/06
[52] U.S. Cl. ......................... 137/1; 137/515.5; 137/540; 251/900
[58] Field of Search ............ 137/515, 515.3, 515.5, 137/515.7, 540, 1; 251/900

[56] References Cited

U.S. PATENT DOCUMENTS

| | | | |
|---|---|---|---|
| 2,655,936 | 10/1953 | Wexler | 251/900 X |
| 2,884,004 | 4/1954 | Dierdorf | 137/540 X |
| 2,906,289 | 12/1956 | Fox . | |
| 2,930,401 | 3/1960 | Cowan | 137/540 |
| 2,959,188 | 11/1960 | Kepner | 137/540 |
| 3,006,364 | 10/1959 | Osborn . | |
| 3,189,046 | 11/1962 | Callahan et al. . | |
| 3,255,774 | 12/1962 | Gallagher et al. . | |
| 3,756,273 | 9/1973 | Hengesbach . | |
| 4,096,884 | 6/1978 | Horowitz | 251/900 X |
| 4,313,463 | 2/1982 | Weirich . | |
| 4,428,396 | 1/1984 | Wall | 137/515 X |

FOREIGN PATENT DOCUMENTS

| | | | |
|---|---|---|---|
| 732860 | 3/1943 | Fed. Rep. of Germany ... | 137/515.5 |
| 685200 | 12/1952 | United Kingdom ............. | 137/540 |

*Primary Examiner*—Robert G. Nilson
*Attorney, Agent, or Firm*—Hamilton, Brook, Smith & Reynolds

[57] ABSTRACT

This invention is comprised of an improved cryogenic refrigeration compressor which contains an externally adjustable relief valve positioned between the helium supply line and the helium return line whereby if the pressure within the helium supply line exceeds a predetermined value the externally adjustable relief valve opens up and allows helium to flow from the supply line to the return line. The relief valve is externally adjustable. It is comprised of a coaxial inlet and outlet member and externally adjustable spring compression means. Together they define a duct. Within the inlet member is a poppet valve and a spring. The spring exerts bias against the valve to close the valve against present fluid pressures. The spring is compressed by rotation of the externally adjustable spring compression means which causes the said spring compression means to project further into the cavity of said inlet member, thus causing the spring to compress further thus increasing the bias poppet valve, therefore a greater fluid pressure is needed to open said valve. The poppet valve of this invention has a cylindrical section and a truncated cone section. The truncated cone section has a multiplicity of bores extending radially therethrough. The inlet port is sealed by the end of the truncated cone section which has a captured O ring extending radially therefrom.

12 Claims, 2 Drawing Figures

CRYOGENIC REFRIGERATOR COMPRESSOR WITH EXTERNALLY ADJUSTABLE BY-PASS/RELIEF VALVE

FIELD OF THE INVENTION

This invention is in the field of cryogenics. More particularly, it relates to a compressor used in a cryogenic refrigerator.

BACKGROUND OF THE INVENTION

In a typical compressor for a cryogenic refrigerator helium returns from a cryogenic refrigerator to a compressor pump via a helium return line. Oil is injected into the helium at the inlet to the compressor. The oil absorbs the heat of compression given off by the helium. The combined mixture of helium and oil is pumped from the compressor through a line to a heat exchanger where the heat contained in the mixture is given off. The helium and oil mixture is then pumped to a bulk oil separator which separates the helium from the oil and the oil returns via a line back to the compressor. The helium travels from separator to an oil mist separator where any residual oil mist is separated from the helium.

The helium travels from the oil mist separator to an adsorber which further removes any remaining impurities from the helium. From the adsorber, the helium is then pumped via a helium supply line to the cold head of a cryogenic refrigerator such as a Gifford-McMahon cryogenic refrigerator. The helium travels through the cryogenic refrigerator and returns via the helium return line back to the compressor where the cycle is again repeated.

An additional helium line lies between the helium supply line and the helium return line. Situated within this line is a differential-pressure relief valve. The line and valve are located in between the helium return line and the helium supply line. Any excess pressure which may build up in the helium supply line to the cryogenic refrigerator can be released through this line and valve and shunted to the helium return line valve. The relief valve automatically opens and allows helium to travel from the supply line to the return line when the pressure fluid within the helium supply line reaches a given predetermined pre-set pressure.

However, the present in-line differential-pressure relief valves must be pre-set on a test board and built into the line of a compressor since all adjustments are internal. When the compressor is placed into operation and the settings within the relief valve are not correct or not matched to the compressor, the valve must be taken off the compressor and re-set on the test board. This practice is costly and wasteful of gas and manpower. In addition, it is virtually impossible to optimize the performance of each compressor unit.

SUMMARY OF THE INVENTION

This invention comprises an externally adjustable in-line relief valve for a fluid system and a cryogenic refrigerator compressor unit with an externally adjustable in-line relief valve. The externally adjustable in-line relief valve is placed in a helium line between the helium supply line and the helium return line in a cryogenic refrigerator compressor. The externally adjustable in- line valve is comprised of a coaxial inlet member, an outlet member and an externally adjustable spring compression member together defining a valve duct. Within the inlet member is a valve seat against which a valve member is pressed by a spring. The externally adjustable spring compression member is connected between the inlet and outlet members so that it can be externally adjusted by rotation resulting in axial translation relative to the inlet and outlet members changing the compression of the spring against the valve member. In this manner, the pressure settings within the valve can be adjusted externally without removing the valve from the fluid line.

In a preferred embodiment, the externally adjustable in-line relief valve has a valve member which is a poppet valve. The poppet valve has a cylindrical section, a truncated cone section and an O ring. The cylindrical section of the valve defines a cavity. A spring is placed into the cavity of the valve and abuts against a retention ridge therein. The truncated portion of the poppet valve extends from the cylindrical portion of the valve. An oval groove is machined in the flat end of the exterior portion of the truncated portion. Into this groove is placed an O ring. The O ring is captured by crimping the flanges which encircle the groove. Only an amount of the O ring sufficient to seal a flat surface extends beyond the groove.

DETAILED DESCRIPTION OF THE INVENTION

Figure 1:
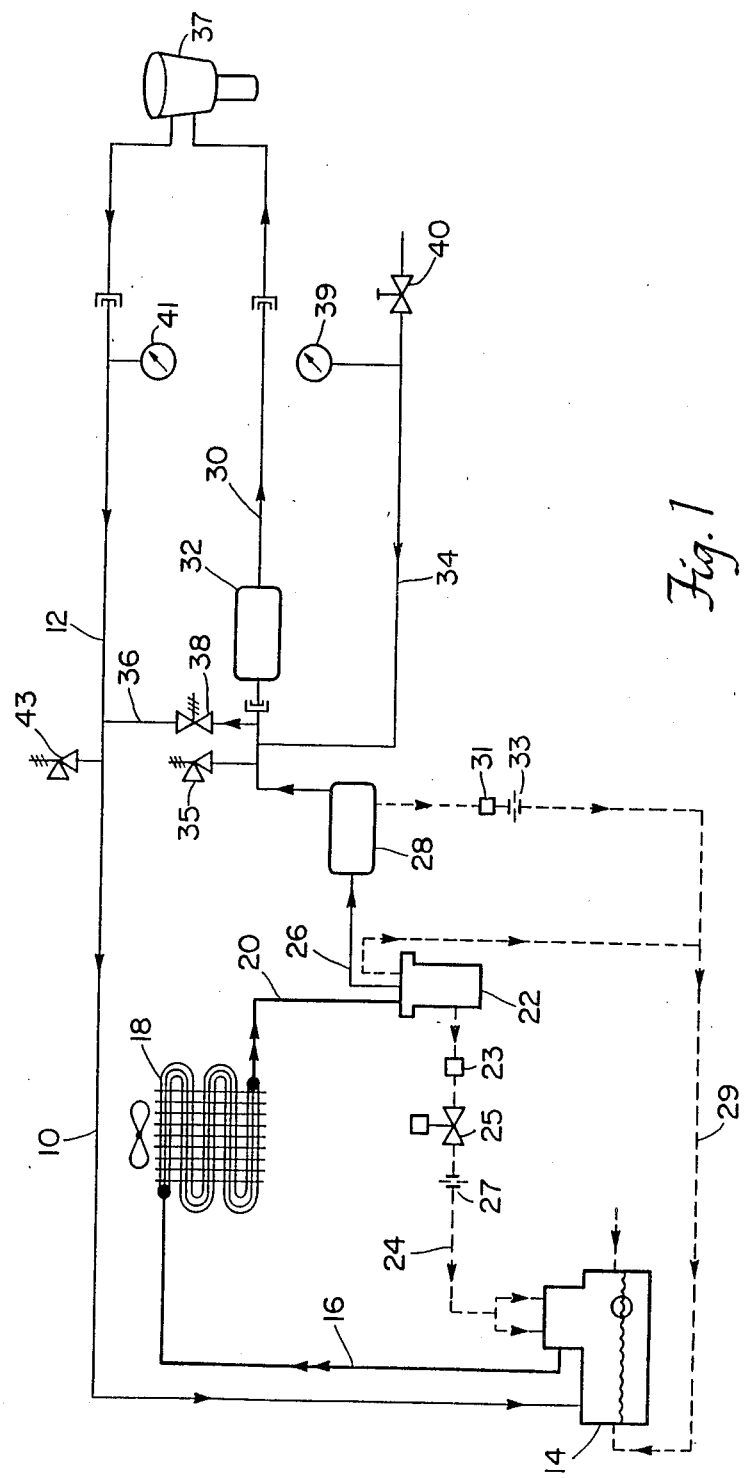
FIG. 1 diagramatically illustrates a typical cryogenic refrigerator compressor of this invention.

The cryogenic refrigerator compressor unit 10 of FIG. 1 is illustrative of a typical compressor unit for a cryogenic refrigerator. It shows a helium return line 12 which carries returning helium from a cryogenic refrigerator to compressor pump 14. Oil is injected into the helium at the inlet to compressor pump 14 and the oil absorbs the heat of compression of the helium as the helium is being compressed by the compressor pump. The helium-oil mixture is then pumped through line 16 to and through heat exchanger 18. The helium and oil mixture passes from heat exchanger 18 through line 20 to bulk-oil separator 22. Separated oil is returned to the compressor pump 14 via line 24 through a filter 23, a valve 25 and an injection orifice 27. Other oil is returned to the sump of the compressor 14 by line 29. The helium is pumped from the bulk-oil separator 22 through line 26 to an oil-mist separator 28 where any remaining oil mist is separated from the helium. That oil is returned to the sump through a filter 31, an orifice 33 and line 29. The helium is pumped from the oil-mist separator 28 through an adsorber 32 which further filters the helium. The helium then travels past a pressure relief valve 35 to the cryogenic refrigerator 37 via helium supply 30. Gas line 34 supplies additional helium to the helium supply line 30 through a valve 40 when the system is charged. Pressure gauges 39 and 41 are coupled to the charging line 34 and to the return line 12. A pressure relief valve 43 is also provided on the return line.

Between the helium return line 12 and helium supply line 30 is line 36. Within line 36 is an in-line, externally adjustable, differential pressure relief valve 38 of this invention. When the pressure of the helium within the supply line 30 reaches a certain point beyond the pressure necessary to overcome the bias against the valve, the valve opens to allow helium to flow from the helium supply line to the helium return line and thus regulate the pressure of the supply line. The relief valve 38 is so designed such that the pressure setting of the valve can be set externally. Thus, it is not necessary to remove the valve from line 36 unlike in-line relief valves of the prior art.

Figure 2:
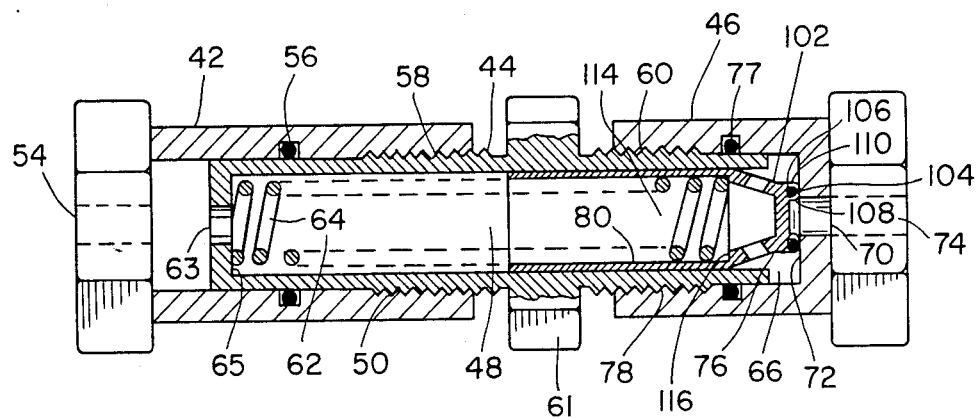
FIG. 2 illustrates a sectional view of the externally adjustable relief valve of this invention.

FIG. 2 is a sectional view of the externally adjustable relief valve 40. Externally adjustable spring compression member 44 is attached to both outlet member 42 and inlet member 46. Outlet member 42 and inlet member 46 have conventional means for connection to the helium lines at outlet port 54 and inlet port 74, respectively. The valve of FIG. 2 is threaded at the inlet and the outlet ports and connect to the helium line by screwing, but other means such as brazing the valve ports onto the helium line may be used. Outlet member 42, compression member 44, and inlet member 46 are coaxial. Together they define an internal valve duct 48. Outlet member 42 can be attached to the compression member 44 by internal threads 50. Adjacent to internal threads 50 proximal to outlet port 54 is an O ring 56 recessed within the wall of outlet member 42. The inner circumference of the O ring extends beyond the edges of threads 50 so as to produce a seal between the O ring and the smooth, non-threaded end 52 of the compression member 44 when the compression member is screwed into outlet member 42. This sealing prevents leakage of helium.

Compression member 44 contains two sets of external threads 58 and 60 such that the compression member can be screwed into both the outlet valve 42 and the inlet member 46. In the middle of compression member 44 is an element onto which a wrenching device can be placed in order to turn the compression member. In this case the element is a hex nut 61 which is welded onto the compression member 44. However, the adjustment element can also be flat sections machined on the exterior of the compression member or holes drilled in the periphery of the compression member for a spanner wrench. When final adjustments are made, a lock wire, set screw or epoxy can be applied to the threads of the compression member to prevent rotation. The end of the cylindrical compression member most proximate to the outlet member contains a bore 63 which extends axially there through. Bore 63 expands into a cavity 62 into which a spring 64 fits. A retention ridge 65 is formed where bore 63 expands into cavity 62. This retention ridge 65 compresses the spring 64 as the compression member 44 rotates into the inlet member 46 and out of the outlet member.

Inlet member 46 forms internal cavity 66 which narrows into bore 70 forming a sealing ridge 72 proximate to the inlet port 74. Within cavity 66 is a valve member 76 which is in this case a poppet valve. A closing force is placed onto the poppet valve by the spring 64.

Inlet member 46 also has internal threads 78 which enable compression member 44 to translate axially into the cavity 66. Adjacent to internal threads 78 proximal to inlet port 74 is a recessed O ring 77 within the internal surface of inlet member 46. The inner circumference of the O ring extends inward beyond the edges of threads 78 so as to produce a seal between said O ring and the compression member 44.

Poppet valve 76 is comprised of a cylindrical portion 80 proximal to the outlet member and a truncated cone portion 102 which is proximal to the inlet port 74. The end of the truncated cone 102 proximate to the inlet port 74 is machined out forming a cavity 106 and flanges 108 and 110. Into this cavity is placed O ring 104. The cavity is so designed to capture about 90% of the O ring. The O ring is captured by crimping flanges 108 amd 110 onto the O ring. This allows sufficient protrusion of the 0 ring so that the O ring can seal against a flat surface such as sealing ridge 72.

The cylindrical portion 80 of the poppet valve defines cavity 114. Retention ridge 116 is formed within the poppet valve where cylindrical portion 80 of the valve narrows to form the truncated cone portion 102 of valve 76. Spring 64 is placed within cavity 114 of the poppet valve and within cavity 62 of the compression member 44. Spring 64 is compressed as compression member 44 is translated axially further into inlet member 46. The spring, in turn, exerts bias against retention ridge 116.

The bias exerted against retention ridge 116 causes poppet valve 76 to be secured against retention ridge 72. This bias determines the amount of gas pressure which is required in the gas supply line to open poppet valve 76 to allow gas to flow from the supply line through the relief valve and into the helium return line.

Equivalents

While the invention has been particularly shown and described with reference to a preferred embodiment thereof, it will be understood by those skilled in the art that various changes in form and details may be made therein without departing from the spirit and scope of the appended claims. For example, the externally adjustable compression member can be either internally or externally threaded so as to screw into the inlet member or the inlet member can screw into the compression member.

I claim:

1. An externally adjustable inline pressure relief valve comprising:
    an inlet member having an inlet port connectable to a supply line;
    an outlet member having an outlet port connectable to an outlet line;
    a compression member between and threadedly coupled to each of the inlet member and the outlet member and having a duct therein for providing fluid communication between the inlet port and the outlet port, the compression member being exposed between the inlet member and outlet member such that it may be gripped to be rotated and thus axially translated relative to the inlet member and the outlet member;
    a valve member axially translatable into contact with the inlet member for closing the inlet port from within the duct; and
    a compression spring compressed by the compression member against the valve member to force the valve member into contact with the inlet member against fluid pressures, the compression of the spring being externally adjustable by rotation of the compression member relative to the inlet member and the outlet member.

2. A pressure relief valve as recited in claim 1, further comprising a first O ring between the inlet member and the compression member and second O ring between the outlet member and the compression member for sealing a fluid path from the inlet port to the outlet port.

3. A pressure relief valve as claimed in claim 2 wherein each end of the compression member is externally threaded in cooperating with internal threads on the respective inlet member and outlet member and wherein the compression member comprises a non-threaded extension beyond the threads at each end thereof, an O ring being positioned between each non-threaded extension and the respective inlet and outlet members.

4. A pressure relief valve as recited in claim 1, wherein the compression spring is retained within the compression member and abuts against a reduced interior diameter portion of the compression member.

5. A pressure relief valve as recited in claim 1, wherein both ends of the compression member are externally threaded and positioned within each of the inlet member and outlet member.

6. A pressure relief valve as recited in claim 1, wherein each of the inlet port and outlet port are threaded for connection to the supply line and outlet line.

7. A pressure relief valve as recited in claim 1, wherein the valve member is a poppet valve.

8. A pressure relief valve as recited in claim 7, wherein the portion of the poppet valve proximal to the outlet port is cylindrical and the portion proximate to the inlet valve is a truncated cone, within the cylindrical portion of said poppet valve is a cavity into which the spring means is placed, the cavity of said cylindrical portion contains a retention ridge against which the spring means abuts, the truncated cone portion of said poppet valve contains a multiplicity of bores extending radially therethrough to the cavity within the cylindrical portion of said valve, the end of the truncated cone of the poppet valve contains a cavity with two connective flanges extending axially therefrom, an O ring is placed within said cavity and is captured into place by crimping the flanges against the O ring allowing only an amount of the O ring to extend beyond the cavity sufficient to seal a flat surface.

9. An externally adjustable inline pressure relief valve comprising:
an inlet member having an inlet port connectable to a fluid supply line;
an outlet member having an outlet port connectable to a fluid outlet line;
a compression member between and threadedly coupled to each of the inlet member and the outlet member and having a duct therein for providing fluid communication between the inlet port and the outlet port, the compression member being exposed between the inlet member and outlet member such that it may be gripped to be rotated and thus axially translated relative to the inlet member and the outlet member;
a valve member axially translatable into contact with the inlet member for closing the inlet port from within the duct; and
a compression spring retained within the compression member and abuts against a reduced interdiameter portion of the compression member such that bias is exerted against the valve member by the spring as the spring is compressed by the compression member to force the valve member into contact with the inlet member against present fluid pressure, the compression of the spring being externally adjustable by rotation of the compression member axially relative to the inlet member and the outlet member, wherein
an O ring is between the inlet member and the compression member and a second O ring is between the outlet member and the compression member for sealing a fluid path from the inlet port to the outlet port;
each end of the compression member is externally threaded and cooperating with internal threads on the respective inlet member and outlet member and wherein the compression member comprises a non-threaded extension beyond the threads at each end thereof, said O rings in the inlet and outlet member being positioned between each non-threaded extension in the respective inlet and outlet members.

10. A pressure relief valve as recited in claim 9, wherein the portion of the poppet valve proximal to the outlet port is cylindrical and the portion proximate to the inlet valve is a truncated cone, within the cylindrical portion of said poppet valve is a cavity into which the spring means is placed, the cavity of said cylindrical portion contains a retention ridge against which the spring means abuts, the truncated cone portion of said poppet valve contain a multiplicity of bores extending radially therethrough to the cavity within the cylindrical portion of said valve, the end of the truncated cone of the poppet valve contains a cavity with connective flanges extending axially therefrom, an O ring is placed within said cavity and is captured into place by crimping the flanges against the O ring allowing only an amount of the O ring to extend beyond the cavity sufficient to seal a flat surface.

11. A poppet valve for a relief valve comprising:
(a) a cylindrical section;
(b) a truncated cone section; and
(c) an O ring, wherein the cylindrical section of the valve defines a cavity into which a spring means is placed, the cavity of said cylindrical section contains a retention ridge against which the spring means abuts, the truncated cone section of said poppet valve extends from the cylindrical section, the truncated cone section of said poppet valve contains a multiplicity of bores extending radially therethrough to the cavity within the cylindrical portion of said poppet valve, the end of the truncated cone of the poppet valve contains a cavity with concentric flanges extending axially therefrom, the O ring is placed within said cavity and is captured into place by the crimping of the flanges against the O ring allowing only an amount of the O ring to extend beyond the cavity sufficient to seal a flat surface.

12. A method for providing variable pressure relief comprising:
connecting an externally adjustable inline pressure relief valve to a fluid supply line and outlet line, said relief valve comprising:
an inlet member having an inlet port connectable to the supply line;
an outlet member having an outlet port connectable to the outlet line;
a compression member between and threadedly coupled to each of the inlet member and the outlet member and having a duct therein for providing fluid communication between the inlet port and the outlet port, the compression member being exposed between the inlet member and outlet member such that is may be gripped to be rotated and thus axially translated relative to the inlet member and the outlet member;
a valve member axially translatable for closing the inlet port from within the duct, and a compression spring compressed by the compression member against the valve member to force the valve member into contact with the inlet member against fluid pressures, the compression of the spring being externally adjustable by rotation of the compression member relative to the inlet member and the outlet member; and rotating the compression member as the inlet and outlet members remain fixed to the supply line and outlet line.

* * * * *